(12) United States Patent
Kanayama et al.

(10) Patent No.: US 7,815,314 B2
(45) Date of Patent: Oct. 19, 2010

(54) ILLUMINATION APPARATUS AND PROJECTION DISPLAY DEVICE

(75) Inventors: Hideyuki Kanayama, Uji (JP); Makoto Maeda, Osaka (JP); Takashi Ikeda, Higashi-Osaka (JP); Ken Mashitani, Neyagawa (JP)

(73) Assignee: Sanyo Electronic Co., Ltd., Moriguchi-shi (JP)

( * ) Notice: Subject to any disclaimer, the term of this patent is extended or adjusted under 35 U.S.C. 154(b) by 562 days.

(21) Appl. No.: 11/927,963

(22) Filed: Oct. 30, 2007

(65) Prior Publication Data
US 2008/0100804 A1    May 1, 2008

(30) Foreign Application Priority Data

Oct. 31, 2006  (JP) ............................. 2006-296282
Sep. 26, 2007  (JP) ............................. 2007-249576

(51) Int. Cl.
G03B 21/00    (2006.01)
G03B 21/14    (2006.01)

(52) U.S. Cl. .......................................... 353/31; 353/20
(58) Field of Classification Search ................... 353/20, 353/31, 33, 34, 37, 81, 84; 349/5, 7–9; 348/339, 348/758
See application file for complete search history.

(56) References Cited

U.S. PATENT DOCUMENTS 6,899,432 B2 *   5/2005   Pentico et al. ................ 353/31

FOREIGN PATENT DOCUMENTS

JP    2002-287247    10/2002

* cited by examiner

Primary Examiner—Thanh X Luu
(74) Attorney, Agent, or Firm—Marvin A. Motsenbocker; Mots Law, PLLC

(57) ABSTRACT

An illumination apparatus includes a red light valve, a green light valve, a blue light valve, a polarization adjustment element, and a color combiner. The polarization adjustment element adjusts polarization of fourth color component light. The color combiner combines light emitted from the red light valve, the green light valve and the blue light valve. Superimposed component light which is any one of a red component light, a green component light and a blue component light enters the polarization adjustment element together with a fourth color component light. The polarization adjustment element transmits the superimposed component light without adjusting the polarization, and transmits the fourth color component light with adjusting the polarization. The superimposed component light and the fourth color component light emitted from the polarization adjustment element enter a specific light valve corresponding to the superimposed component light, among the red light valve, the green light valve and the blue light valve.

6 Claims, 13 Drawing Sheets

FIG. 5

| | POLARIZATION ADJUSTMENT ELEMENT Ye | | | POLARIZING PLATE |
|---|---|---|---|---|
| | COLOR COMPONENT LIGHT | ENTERING LIGHT | OUTPUTTING LIGHT | |
| | | | POWER OFF / POWER ON | |
| POLARIZATION ADJUSTMENT ELEMENT Ye-1 | YELLOW COMPONENT LIGHT Ye | P POLARIZATION | P POLARIZATION / S POLARIZATION | POLARIZING PLATE G-1 (P POLARIZATION: TRANSMISSION S POLARIZATION: SHIELD) |
| | GREEN COMPONENT LIGHT G | | P POLARIZATION / P POLARIZATION | |
| POLARIZATION ADJUSTMENT ELEMENT Ye-2 | YELLOW COMPONENT LIGHT Ye | P POLARIZATION | S POLARIZATION / P POLARIZATION | |
| | GREEN COMPONENT LIGHT G | | P POLARIZATION / P POLARIZATION | |
| POLARIZATION ADJUSTMENT ELEMENT Ye-1 | YELLOW COMPONENT LIGHT Ye | S POLARIZATION | S POLARIZATION / P POLARIZATION | POLARIZING PLATE G-2 (S POLARIZATION: SHIELD P POLARIZATION: TRANSMISSION) |
| | GREEN COMPONENT LIGHT G | | S POLARIZATION / S POLARIZATION | |
| POLARIZATION ADJUSTMENT ELEMENT Ye-2 | YELLOW COMPONENT LIGHT Ye | S POLARIZATION | P POLARIZATION / S POLARIZATION | |
| | GREEN COMPONENT LIGHT G | | S POLARIZATION / S POLARIZATION | |

FIG. 7

| | | COLOR SIGNAL | | | |
|---|---|---|---|---|---|
| | | R | G | B | Ye |
| COLOR DISPLAY | BLACK | − | − | − | − |
| | WHITE | ○ | ○ | ○ | ○ |
| | R | ○ | − | − | − |
| | G | − | ○ | − | − |
| | B | − | − | ○ | − |
| | Ye | ○ | ○ | − | △ |
| | OTHERS | ○ | ○ | ○ | ○ |

ILLUMINATION APPARATUS AND PROJECTION DISPLAY DEVICE

CROSS REFERENCE TO ELATED APPLICATIONS

This application is based upon and claims the benefit of priority from prior Japanese Patent Application No. 2006-296282, filed on Oct. 31, 2006; and Japanese Patent Application No. 2007-249576, filed on Sep. 26, 2007; the entire contents of which are incorporated herein by reference.

BACKGROUND OF THE INVENTION

1. Field of the Invention

The present invention relates to an illumination apparatus and a projection display device, which utilize fourth color component light in addition to red component light, green component light, and blue component light.

2. Description of the Related Art

Conventionally, a projection display device has been known, which provided with light valves corresponding to three colors, a cross dichroic cube that combines lights emitted from the three light valves, and a projection mean that projects a light combined by the cross dichroic cube.

Herein, the cross dichroic cube has three light incident surfaces which light enters and one light-emitting surface from which light is emitted. Accordingly, in the case of using three colors of light to be incident on the cross dichroic cube, it suffices that the projection display apparatus has one cross dichroic cube.

On the other hand, for the purpose of improving color reproduction capability and luminance, there has been proposed a projection display apparatus using four or more colors of light. By using, for example, orange, yellow, or cyan light in addition to three colors of red, green, and blue light, such a projection display apparatus is intended to improve color reproduction capability and luminance (for instance, see Japanese Patent Publication No. 2002-287247 (claims 1 and 4, FIG. 1, and the like)).

When lights of four colors or more are utilized in the projection display apparatus, lights of four colors or more cannot be combined by one cross dichroic cube. For this reason, the projection display apparatus should be provided with a plurality of dichroic cubes (or cross dichroic cubes).

For example, when a combination of lights of four different colors is needed, the projection display apparatus obtains two combined lights in each of which lights of two different colors are combined, and further combines the two combined lights to obtain a combined light of four different colors. In addition, the projection display apparatus may obtain a combined light in which lights of three different colors are combined and combine the obtained light with one color light to obtain a combined light of four different colors. Moreover, the projection display apparatus may obtain a combined light in which lights of two different colors are combined and combine the obtained light with color lights of two different colors to obtain a combined light of four different colors.

Here, an optical path length from each of the light valves corresponding to four or more colors to the projection mean should be the same. Moreover, there is need to provide a plurality of dichroic cubes (or cross dichroic cubes) between the light valves and the projection mean. Accordingly, the back focus of the projection mean becomes longer.

As a result, a projection mean used in a projection display apparatus using light of three colors cannot be used for the one using light of four or more colors, leading to an increase in manufacturing cost of the projection display apparatus as a whole.

SUMMARY OF THE INVENTION

In an aspect of the present invention, an illumination apparatus (a lighting unit 120) includes a red light valve liquid crystal panel 30R) configured to modulate red component light according to a red input signal, a green light valve (liquid crystal panel 30G) configured to modulate green component light according to a green input signal, a blue light valve (liquid crystal panel 30B) configured to modulate blue component light according to an blue input signal, and a polarization adjustment element (a polarization adjustment element 30Ye) configured to adjust polarization of fourth color component light. The illumination apparatus includes a color combiner (a cross dichroic cube 50) configured to combine lights emitted from the red light valve, the green light valve, and the blue light valve. Superposed component light which is any one of the red component light, the green component light, and the blue component light (for example, green component light) enters the polarization adjustment element together with the fourth color component light. The polarization adjustment element transmits the superimposed component light without adjusting the polarization, and transmits the fourth color component light with adjusting the polarization. The superimposed component light and the fourth color component light which are emitted from the polarization adjustment element enter a specific light valve (the liquid crystal panel 30G) corresponding to the superimposed component light, among the red light valve, the green light valve, and the blue light valve.

According to the above aspect, the polarization adjustment element transmits the superimposed component light without adjusting the polarization and transmits the fourth color component light with adjusting the polarization. The fourth color component light and the superimposed component light emitted from the polarization adjustment element, enter a light valve corresponding to the superimposed component light. Namely, the fourth color component light is superimposed on the superimposed component light so as to be supplied to a color combiner. Accordingly, the number of types of light to enter the color combiner is three even when the fourth color component light is utilized in addition to the red component light, the green component light and the blue component light. As a result, there is no need to change design of a projection mean and it is possible to suppress an increase in manufacturing cost of the entire apparatus.

Moreover, the fourth component light is superimposed on superimposed component light to be projected, resulting in improvement of luminance of an image projected on a screen by the projection mean.

As mentioned above, the polarization adjustment element transmits superimposed component light without adjusting the polarization and transmits the fourth color component light with adjusting the polarization. Thus, only by arranging a polarization adjustment element on the optical path of the superimposed component light in the configuration of the illumination apparatus using three color lights, it is applicable for new type utilizing four colors. That is, designation loads accompanying the application of the new type can be reduced, and cost merits can be obtained.

In the above aspect, the polarization adjustment element is an element configured to selectively switch whether the polarization direction of the fourth color component light is not rotated or the polarization direction of the fourth color component light is rotated at 90°.

In the above aspect, the resolution of the polarization adjustment element is lower than resolutions of the red light valve, the green light valve, and the blue light valve.

In the above aspect, the illumination apparatus is further provided with a modulation amount controller (a modulation amount controller 220) configured to control a modulation amount for adjusting the polarization of the fourth component light by the polarization adjustment element, on the basis of the red input signal, green input signal and blue input signal.

In the above aspect, the specific light valve (for example, the liquid crystal panel 30G) has a light-incident-side polarizing plate (a polarizing plate 31G) provided on a light incident side and a light-emitting-side polarizing plate (a polarizing plate 32G) provided on a light-emitting side. The light-incident-side polarizing plate shields the fourth color component light when the fourth color component light is not to be emitted to the color combiner and the light-emitting-side polarizing plate shields the superimposed component light when the superimposed component light is not to be emitted to the color combiner.

Note that, light-incident-side polarizing plates and light-emitting-side polarizing plate are provided with the red light valve, green light valve, and blue light valve.

In an aspect of the present invention, a projection display device includes a light source (a light source 10) configured to emit red component light, green component light, blue component light, and a fourth color component light; a red light valve (a liquid crystal panel 30R) configured to modulate the red component light according to an red input signal; a green light valve (a liquid crystal panel 30G) configured to modulate the green component light according to an green input signal; a blue light valve (a liquid crystal panel 30B) configured to modulate the blue component light according to an blue input signal; and a polarization adjustment element (a polarization adjustment element 30Ye) configured to adjust polarization of the fourth color component light. The projection display device includes a color combiner (a cross dichroic cube 50) configured to combine light emitted from the red light valve, the green optical component, and the blue light valve, and the projection mean (a projection lens unit 110) configured to project light combined by the color combiner. Superposed component light which is any one of the red component light, the green component light, and the blue component light (for example, green component light) enters the polarization adjustment element together with the fourth color component light. The polarization adjustment element transmits the superimposed component light without adjusting the polarization, and transmits the fourth color component light with adjusting the polarization. The superimposed component light and the fourth color component light which are emitted from the polarization adjustment element enter a specific light valve (the liquid crystal panel 30G) corresponding to the superimposed component light, among the red light valve, the green light valve, and the blue light valve.

BRIEF DESCRIPTION OF THE DRAWINGS

FIG. 5 is a table showing combinations of the polarization adjustment element 30Ye and a polarizing plate 31G according to the first embodiment;

FIG. 7 is a table showing relationships of an image color and each color signal according to the second embodiment;

DESCRIPTION OF PREFERRED EMBODIMENTS

Figure 1:
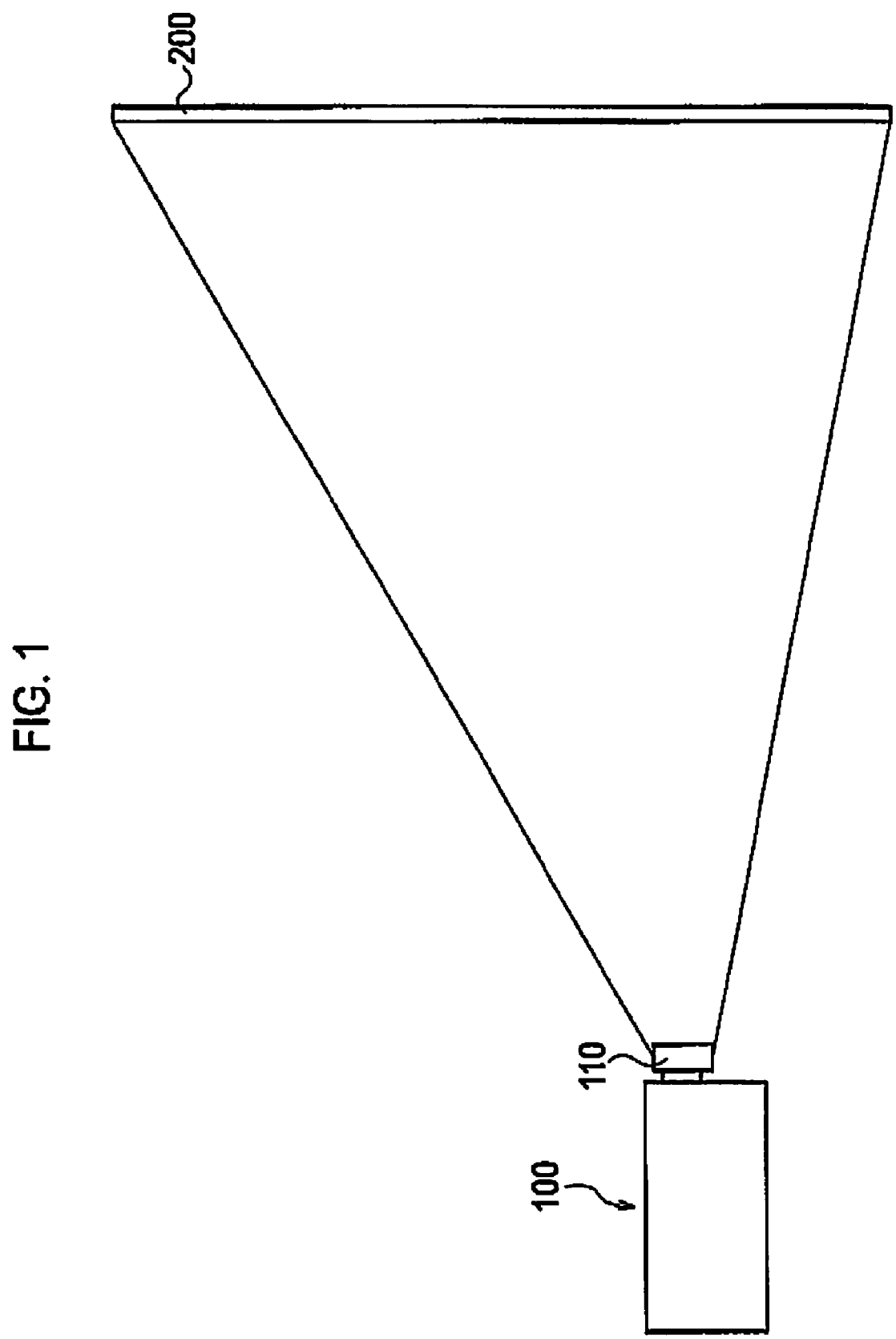
FIG. 1 is a view schematically showing a projection display device 100 according to a first embodiment.

A projection display device according to preferred embodiments of the present invention will be described by referring to the drawings. Note that same or similar reference numerals are given to denote same or similar portions in the drawings.

In addition, the drawings are merely schematically shown and proportions of sizes and the like are different from actual ones. Thus, specific sizes and the like should be judged by referring to the description below. In addition, needless to say, there are included portions where relationships or proportions of sizes of the drawings are different with respect to one another.

First Embodiment (Outline of a Projection Display Device)

An outline of a projection display device according to a first embodiment of the present invention will be described below by referring to the drawings. FIG. 1 is a view schematically showing a projection display device 100 according to the first embodiment.

As shown in FIG. 1, the projection display device 100 has a projection lens unit 110 and projects image light enlarged by the projection lens unit 110 onto a screen 200. As will be described later, the projection display device 100 uses yellow component light as fourth color component light in addition to red component light, green component light, and blue component light.

(Schematic Configuration of a Lighting Unit)

Figure 2:
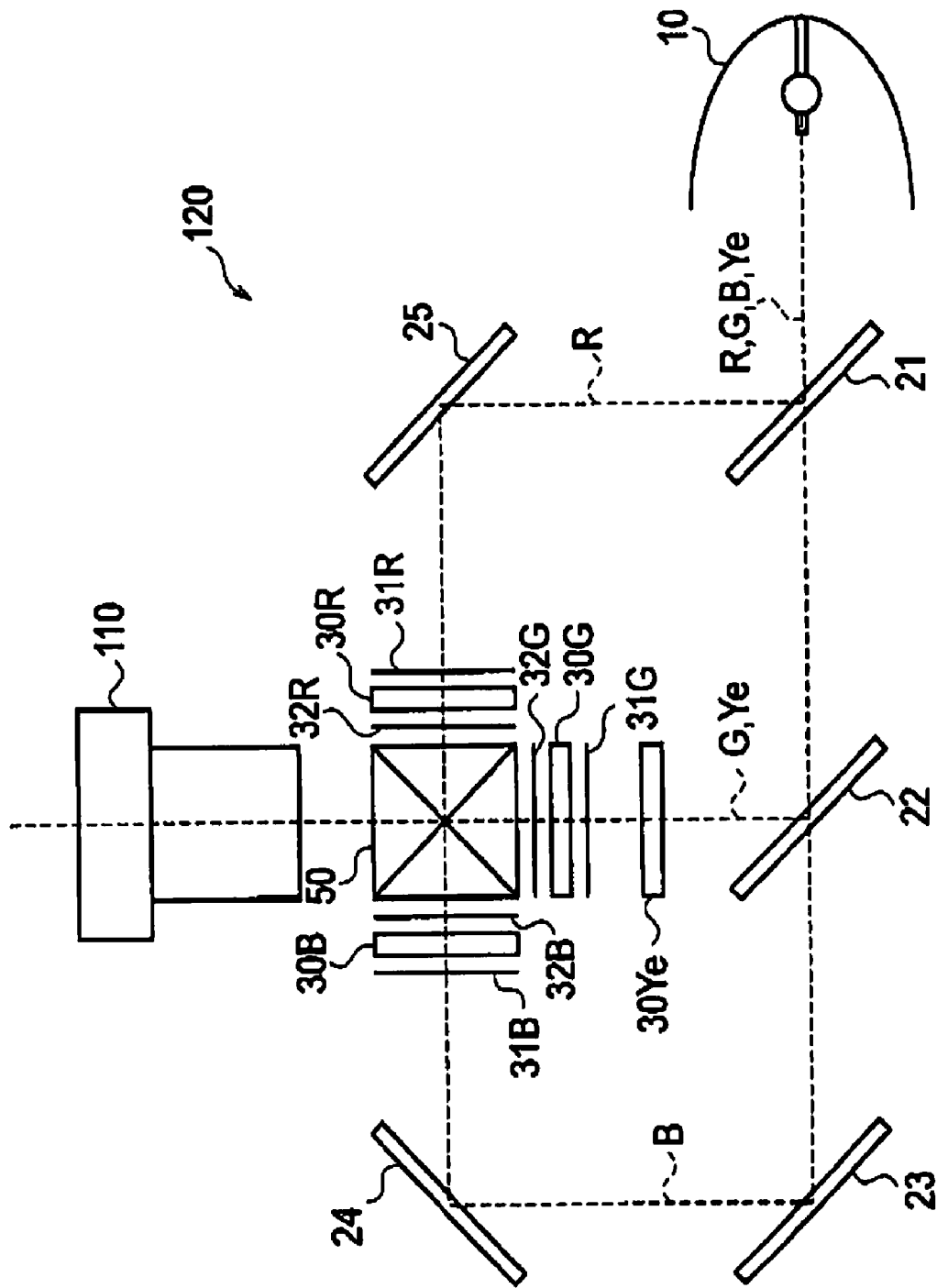
FIG. 2 is a view schematically showing a configuration of a lighting unit 120 according to the first embodiment.

A schematic configuration of a lighting unit according to the first embodiment will be described below by referring to the drawing. FIG. 2 is a view schematically showing a configuration of a lighting unit 120 according to the first embodiment. Note that in FIG. 2, a pair of fly-eye lenses configured to uniformize lights emitted from a light source 10, PBS (Polarized Beam Splitter) configured to cause polarization directions of the lights emitted from the light source 10 to be one polarization direction (for example, P polarization direction), and the like are omitted.

As shown in FIG. 2, the lighting unit 120 includes a light source 10, a plurality of liquid crystal panels 30 (liquid crystal panels 30R, 30G, and 30B), a polarization adjustment element 30Ye, and a cross dichroic cube 50. Note that in FIG. 2, the projection lens unit 110 is shown in the figure, but the projection lens unit 110 is not provided in the lighting unit 120.

The light source 10 is, for example, a UHP lamp which emits white light. That is, light emitted from the light source 10 includes at least red component light, green component light, blue component light and yellow component light.

Figure 3:
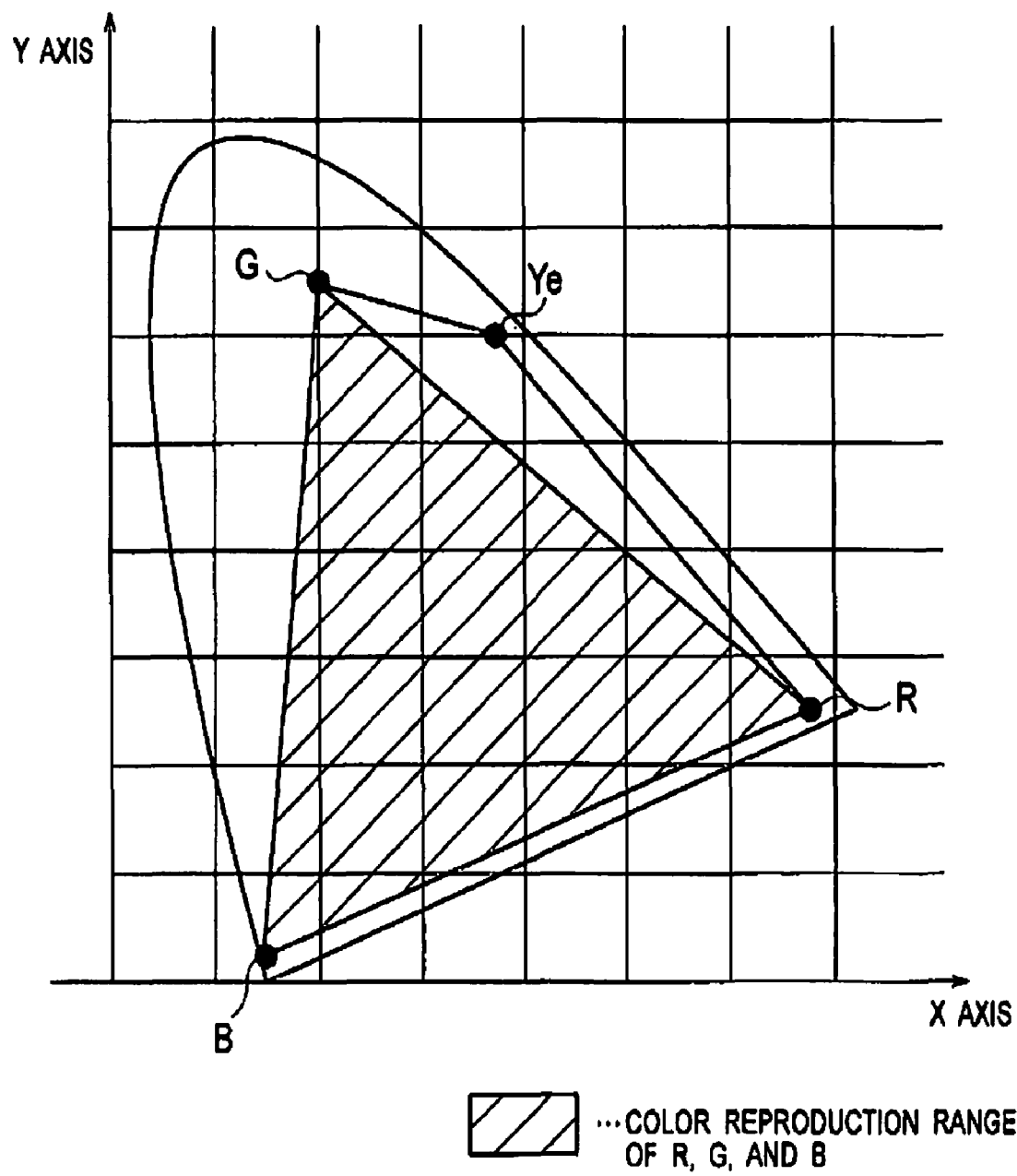
FIG. 3 is a view showing color reproduction ranges of R, G, and B according to the first embodiment.

Here, as shown in FIG. 3, the yellow component light is light capable of reproducing a color outside color ranges (color reproduction ranges of R, G, and B) that the red component light, the green component light, and the blue component light can reproduce. In the projection display device using three color lights, the yellow component light is eliminated during color separation.

The liquid crystal panel 30R modulates red component light by rotating the polarization direction of the red component light. On a light-incident-side of the liquid crystal panel 30R, there is provided a polarizing plate 31R that transmits light having one polarization direction for example, P polarization) and shields light having another polarization direction (for example S polarization). In contrast, on a light-emitting side of the liquid crystal panel 30R, there is provided a polarizing plate 32R that transmits light having another polarization direction (for example, S polarization) and shields light having one polarization direction (for example, P polarization).

Accordingly, when the liquid crystal panel 30R doss not rotate the polarization direction of the red component light, the red component light which transmitted the polarizing plate 31R is shielded by the polarizing plate 32R. Thus, the cross dichroic cube 50 is not irradiated with the red component light. On the other hand, if the liquid crystal panel 30R rotates the polarization direction of the red component light, the red component light which transmitted the polarizing plate 31R transmits the polarizing plate 32R. Thus, the cross dichroic cube 50 is irradiated with the red component light.

Similarly, the liquid crystal panel 30G modulates green component light and yellow component light by rotating polarization directions of the green component light and the yellow component light. On a light-incident-side of the liquid crystal panel 30G, there is provided a polarizing plate 31G that transmits light having one polarization direction and shields light having another polarization direction. In contrast, on a light-emitting side of the liquid crystal panel 30G, there is provided a polarizing plate 32G that transmits light having another polarization direction and shields light having one polarization direction.

The liquid crystal panel 30B modulates blue component light by rotating the polarization direction of the blue component light. On a light-incident-side of the liquid crystal panel 30B, there is provided a polarizing plate 31B that transmits light having one polarization direction and shields light having another polarization direction. In contrast, on a light-emitting side of the liquid crystal panel 30B, there is provided a polarizing plate 32B that transmits light having another polarization direction and shields light having one polarization direction.

The polarization adjustment element 30Ye modulate yellow component light by adjusting polarization of the yellow component light. In contrast, the polarization adjustment element 30Ye transmits green component light without adjusting the polarization of the green component light.

Here, a polarization adjustment element is capable of adjusting a polarization of a linear polarization light entering itself, and emits linear polarization light or elliptic polarization light (or spin polarization light).

For example, the polarization adjustment element may selectively switch whether emitting the linear polarization light without adjusting the polarization direction of the linear polarization light entering itself, or emitting the rotated linear polarization light by rotating the polarization direction of the linear polarization light entering itself at 90°, on the basis of whether voltage is applied to itself or not.

The polarization adjustment element may adjust an angle formed by the linear polarization light entering itself and the linear polarization light emitted from itself in a range of 0-90°, on the basis of voltage amount applied to itself.

The polarization adjustment element may adjust the linear polarization light entering itself to the elliptic polarization light (or the spin polarization light), on the basis of voltage amount applied to itself.

Moreover, light amount transmitting a polarizing plate provided on the light emitting side of the polarization adjustment element can be controlled, by adjustment of the polarization direction performed by the polarization adjustment element.

A notch type element or an edge type element may be used as the polarization adjustment element.

The notch type element is capable of adjusting only the polarization of light having specific wavelength band. For example, the notch type element adjusts only the polarization of light having a wavelength band longer than green (i.e. the wavelength band of yellow). It is possible to reduce unnecessary light (i.e. yellow component light), by using the notch type element.

The edge type element is capable of adjusting the polarization of light having other wavelength band other than specific wavelength band, without adjusting the polarization of light having the specific wavelength band. For example, the edge type element adjusts the polarization of light having a wavelength band longer or shorter than a wavelength band of green, without adjusting the polarization of light having the wavelength band of green. It is possible to increase color purity of light having the specific wavelength band (i.e. the green component light), by using the edge type element.

Note that the polarization adjustment element 30Ye according to the first embodiment is an element configured to selectively switch whether the polarization direction of yellow component light is not rotated or the polarization direction of the yellow component light is rotated at 90°. In addition, note that the polarization adjustment element 30Ye does not have a configuration in which a polarization direction of yellow component light is to be switched for each of a plurality of divided regions (for example, a pixel), and is an element configured to rotate all the polarization directions of yellow component light which enters the polarization adjustment element 30Ye.

Figure 4A:
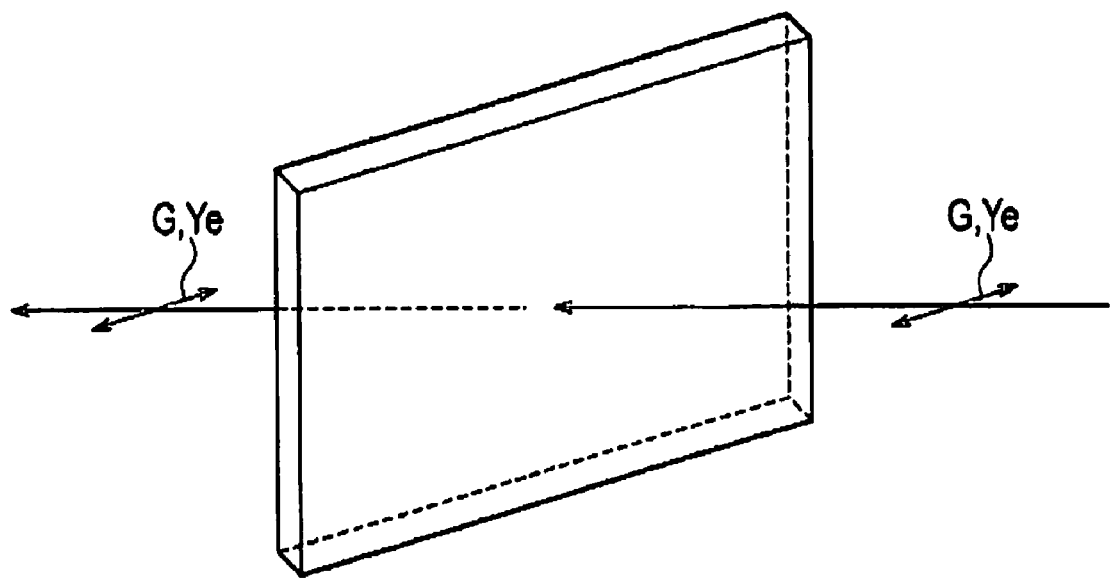
FIGS. 4A and 4B are views showing a polarization adjustment element 30Ye according to the first embodiment.

For example, as shown in FIG. 4A, the polarization adjustment element 30Ye transmits green component light and yellow component light without rotating the polarization directions of the green component light and the yellow component light in a state where a voltage is not supplied to the polarization adjustment element 30Ye (power is off).

Figure 4B:
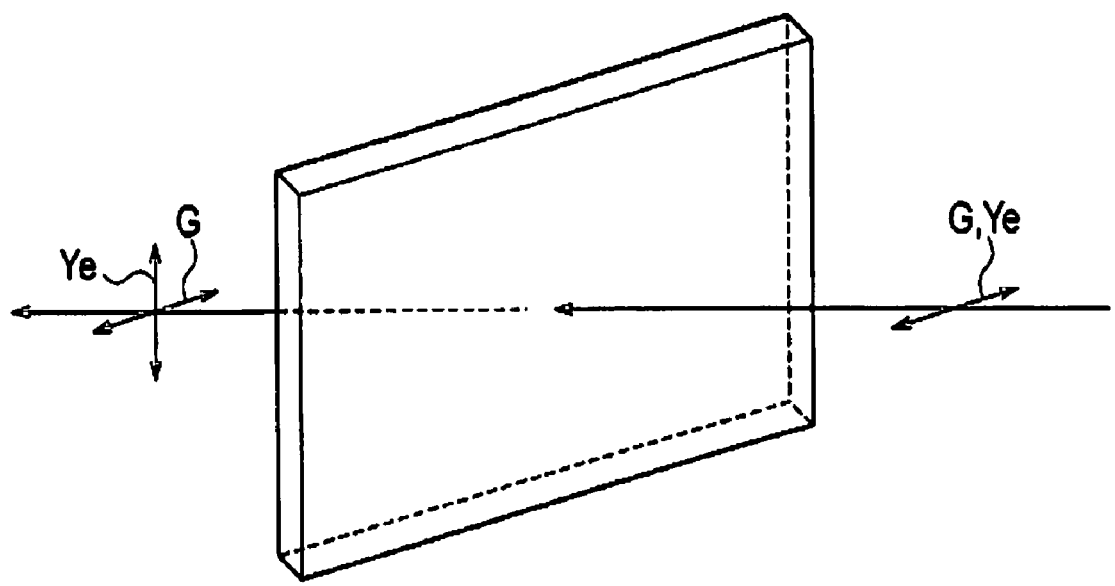

In contrast, as shown in FIG. 4B, the polarization adjustment element 30Ye transmits green component light and yellow component light by rotating only the polarization direction of the yellow component light at 90° in a state where a voltage is supplied to the polarization adjustment element 30Ye (power is on).

Here, the yellow component light and the green component light which are emitted from the polarization adjustment element 30Ye are irradiated to the polarizing plate 31G. The polarizing plate 31G transmits light having one polarization direction (for example, P polarization) and shields light having another polarization (for example, S polarization). Accordingly, a light amount of the yellow component light which reaches the cross dichroic cube 50 is controlled on the basis of whether or not the polarization adjustment element 30Ye rotates the polarization direction of the yellow component light.

The cross dichroic cube 50 combines lights which are emitted from the liquid crystal panels 30R, 30G, and 30B. That is, the cross dichroic cube 50 combines the red component light emitted from the liquid crystal panel 30R, the green component light and the yellow component light which are emitted from the liquid crystal panel 30G, and the blue component light emitted from the liquid crystal panel 30B. In addition, the cross dichroic cube 50 emits a combined light (image light) including the red component light, the green component light, the blue component light, and the yellow component light towards the projection lens unit 110.

As mentioned above, the projection lens unit 110 projects a combined light image light) which is combined by the cross dichroic cube 50 onto a screen 200.

The lighting unit 120 has a plurality of mirror groups (mirrors 21 to 25). The mirror 21 is a cross dichroic mirror configured to transmit the blue component light, the green component light, and the yellow component light, and reflect the red component light. The mirror 22 is a cross dichroic mirror configured to reflect the green component light and the yellow component light and transmit the blue component light. The mirrors 23 and 24 are mirrors configured to reflect the blue component light to lead it towards the liquid crystal panel 30B. The mirror 26 is a mirror configured to reflect the red component light to lead it toward the liquid crystal panel 30R.

(Functions of the Polarization Adjustment Element)

Functions of the polarization adjustment element according to the first embodiment will be described below by referring to the drawing. FIG. 5 is a table showing functions of the fourth color light valve (the polarization adjustment element 30Ye) according to the first embodiment.

Specifically, in FIG. 5, combinations of the polarization adjustment element 30Ye and the polarizing plate 31G are shown. A polarization adjustment element Ye-1 is an element configured to rotate only a polarization direction of yellow component light at 90° in a state where a voltage is supplied (power is on). In contract, a polarization adjustment element Ye-2 is an element configured to rotate only a polarization direction of yellow component light at 90° in a state where a voltage is not supplied (power is off).

A polarizing plate G-1 is an element configured to transmit light having P polarization and shield light having S polarization. For example, the polarizing plate G-1 is used when lights emitted from the light source 10 are caused to have P polarization. In contrast, a polarizing plate G-2 is an element configured to transmit light having S polarization and shield light having P polarization. For example, the polarizing plate G-2 is used when lights emitted from the light source 10 are caused to have S polarization.

As shown in FIG. 5, in a case where lights emitted from the light source 10 are caused to have P polarization, when the polarization adjustment element Ye-1 is used, the light amount of yellow component light which reaches the cross dichroic cube 50 becomes maximum in a state where a voltage is not supplied to the polarization adjustment element Ye-1 power is off). Note that since the polarization direction (S polarization) of yellow component light differs from the polarization direction (P direction) of green component light, the yellow component light having S polarization is shielded by the polarizing plate G-1 (the polarizing plate 31G provided on the light-incident-side of the liquid crystal panel 35G).

In contrast, in a case where the polarization adjustment element Ye-2 is used, the light amount of yellow component light which reaches the cross dichroic cube 50 becomes maximum in a state where a voltage is supplied to the polarization adjustment element Ye-2 (power is on). Note that in the state where a voltage is not supplied to the polarization adjustment element Ye-2, the polarization direction of yellow component light (S polarization) differs from the polarization direction of green component light (P polarization), and thus the yellow component light having S polarization is shielded by the polarizing plate G-1 (the polarizing plate 31G provided on the light-incident-side of the liquid crystal panel 35G).

Next, in a case where lights emitted from the light source 10 are caused to have S polarization, when the polarization adjustment element Ye-1 is used, the light amount of yellow component light which reaches the cross dichroic cube 50 becomes maximum in a state where a voltage is not supplied to the polarization adjustment element Ye-1 (power is off). Note that in the state where a voltage is not supplied to the polarization adjustment element Ye-1, the polarization direction of yellow component light (P polarization) differs from the polarization direction of green component light (S polarization), and thus the yellow component light having P polarization is shielded by the polarizing plate G-2 (the polarizing plate 31G on the light-incident-side of the liquid crystal panel 35G).

In contrast, if the polarization adjustment element Ye-2 is used, the light amount of yellow component light which reaches the cross dichroic cube 50 becomes maximum in a state where a voltage is supplied to the polarization adjustment element Ye-2 (power is on). Note that in a state where a voltage is not supplied to the polarization adjustment element Ye-2, the polarization direction of yellow component light (P polarization) differs from the polarization direction of green component light (S polarization), and thus the yellow component light having P polarization is shielded by the polarizing plate G-2 (the polarizing plate 31G provided on the light-incident-side of the liquid crystal panel 35G).

(Function and Effect)

In the projection display device 100 according to the first embodiment, the polarization adjustment element 30Ye transmits the green component light without modulating the green component light and transmits the yellow component light after modulating the yellow component light. The green component light and the yellow component light which are emitted from the polarization adjustment element 30Ye enter the liquid crystal panel 30G. That is, the yellow component light is superimposed on the green component light and then supplied to the cross dichroic cube 50. Thus, even if yellow component light is used in addition to red component light, green component light, and blue component light, lights which enter the cross dichroic cube 50 are three kinds of lights. Accordingly, there is no need to change the design of the projection lens unit 110, and thus the increase in the entire cots for the device can be suppressed.

In addition, the yellow component light is projected after being superimposed on the green component light. Thus, luminance of an image to be projected by the projection lens unit 110 on a screen or the like can be improved.

As described above, the polarization adjustment element 30Ye transmits the green component light without modulating the green component light and transmits the yellow component light after modulating the yellow component light. Thus, only by arranging a polarization adjustment element on the optical path of the superimposed component light in the configuration of the projection display device using three color lights, it is applicable for new type utilizing four colors. That is, designation loads accompanying the application of the new type can be reduced, and cost merits can be obtained.

Second Embodiment

A second embodiment of the present invention will be described below by referring to the drawings. In the following, the description will be mainly given to denote differences between the above-mentioned first embodiment and the second embodiment.

Specifically, it is not particularly mentioned in the above-mentioned first embodiment, but in the second embodiment, a rotation amount of yellow component light rotated by a polarization adjustment element 30Ye is controlled according to red input signal, green input signal, and blue input signal.

In addition, in the above-mentioned first embodiment, the polarization adjustment element 30Ye is an element configured to selectively switch whether a polarization direction of yellow component light is not rotated or a polarization direction of yellow component light is rotated at 90°. In contrast, in the second embodiment, a polarization direction of yellow component light is controlled in a range of 0 to 90°, by adjusting the polarization of the yellow component light by the polarization adjustment element 30Ye.

(Functions of a Projection Display Device)

Figure 6:
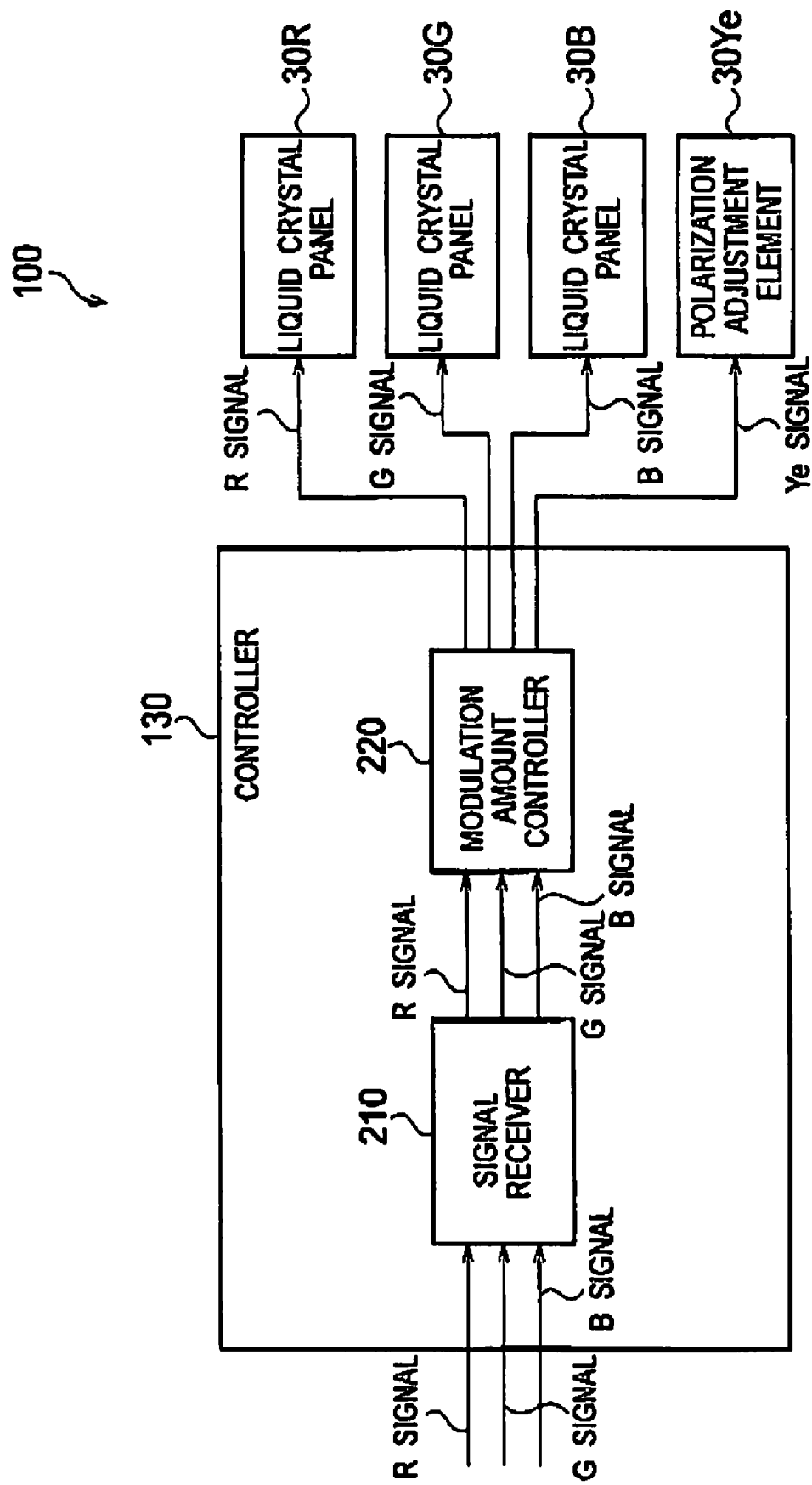
FIG. 6 is a block diagram showing functions of a projection display device 100 according to a second embodiment.

Functions of a projection display device according to the second embodiment will be described below by referring to the drawings. FIG. 6 is a block diagram showing functions of a projection display device 100 according to the second embodiment.

As shown in FIG. 6, the projection display device 100 includes a controller 130 including a signal receiver 210 and a modulation amount controller 220.

The signal receiver 210 is configured to receive each color signal (red input signal, green input signal, and blue input signal). For example, the signal receiver 210 acquires each color signal from a color separation block which separates a color signal from an image signal.

The modulation amount controller 220 is configured to control modulation amounts of liquid crystal panels 30 (liquid crystal panels 30R, 30G, 30B, and 30Ye) on the basis of each color signal acquired from the signal receiver 210.

Specifically, the modulation amount controller 220 inputs a red input signal to the liquid crystal panel 30B without modulation. Similarly, the modulation amount controller 220 inputs a green input signal to the liquid crystal panel 30G without modulation, and inputs a blue input signal to the liquid crystal panel 30B without modulation. Meanwhile, the modulation amount controller 220 calculates a rate of contribution of the yellow component light according to the red input signal green input signal and blue input signal so as to create a yellow signal for controlling the modulation amount of yellow component light.

Here, the modulation amount controller 220 calculates a representative value of luminance based on the red input signal, the green input signal, and the blue input signal. The representative value of luminance means a minimum value of luminance, a maximum value of luminance, a mean value of luminance, or the like. Next, the modulation amount controller 220 determines a superimposed amount of yellow component light for an image depending on the representative value of luminance, so that the modulation amount of the polarization adjustment element 30Ye is controlled.

For example, in a case where each color signal is expressed by 8 bit series, if the representative value of luminance is 255, a value of the yellow signal becomes maximum (that is, 255). In contrast, if the representative value of luminance is 128, a value of the yellow signal becomes a half of the maximum value (that is, 128).

Accordingly, when an image to be displayed on a screen 200 is black, the representative value of luminance becomes 0, and thus the value of the yellow signal also becomes 0. In contrast, when the image to be displayed on the screen 200 is white, the representative value of luminance becomes 255, and thus the value of the yellow signal also becomes 255. Consequently, when the image to be displayed on the screen 200 is white, light emitted from the polarization adjustment element 30Ye is added to light emitted from the liquid crystal panel 30G, and the luminance of the image to be displayed on the screen 200 is improved.

Next, the description will be given to a relationship between a color of image and color component light to be used for color reproduction. Specifically, the amount of each color component light (that is, a modulation amount of each liquid crystal panel 30) is controlled on the basis of the color of image. As shown in FIG. 7, when the image is white, all of red component light, green component light, blue component light, and yellow component light are used. When the image is black, all of red component light, green component light, blue component light, and yellow component light are not used.

When the image is red, only the red component light is used. Similarly, when the image is green, only the green component light is used, and when the image is blue, only the blue component light is used.

When the image is yellow, yellow component light enters the liquid crystal panel 30G, and it is impossible to use only the yellow component light. Thus, to prevent the green component light from being added to the yellow component light, the red component light and the green component light are used without using the yellow component light. Note that needless to say, the yellow component light can be used within a range in which a color balance of yellow can be kept.

When the image is a color other than white, black, red, green, blue, and yellow, all of red component light, green component light, blue component light, and yellow component light are used. Note that the modulation amount for adjusting the polarization of yellow component light (that is, the value of the yellow signal) is selected according to the red input signal, the green input signal, and the blue input signal as needed.

(Function and Effect)

In the projection display device 100 according to the second embodiment, the yellow signal (the rotation amount of the polarization direction of yellow component light) is controlled based on the red input signal, the green input signal, and the blue input signal. Thus, it is possible to properly improve luminance of an image without losing the color balance of the image to be projected on the screen 200.

Third Embodiment

A third embodiment of the present invention will be described below by referring to the drawings. In the following, the description will be mainly given to differences between the above-mentioned first embodiment and the third embodiment.

Specifically, in the above-mentioned first embodiment, a transmission type crystal panel is used as a light valve, but in the third embodiment, a reflection-type liquid crystal panel (LOCS: Liquid Crystal On Silicon) is used as a light valve.

(Configuration of a Lighting Unit)

Figure 8:
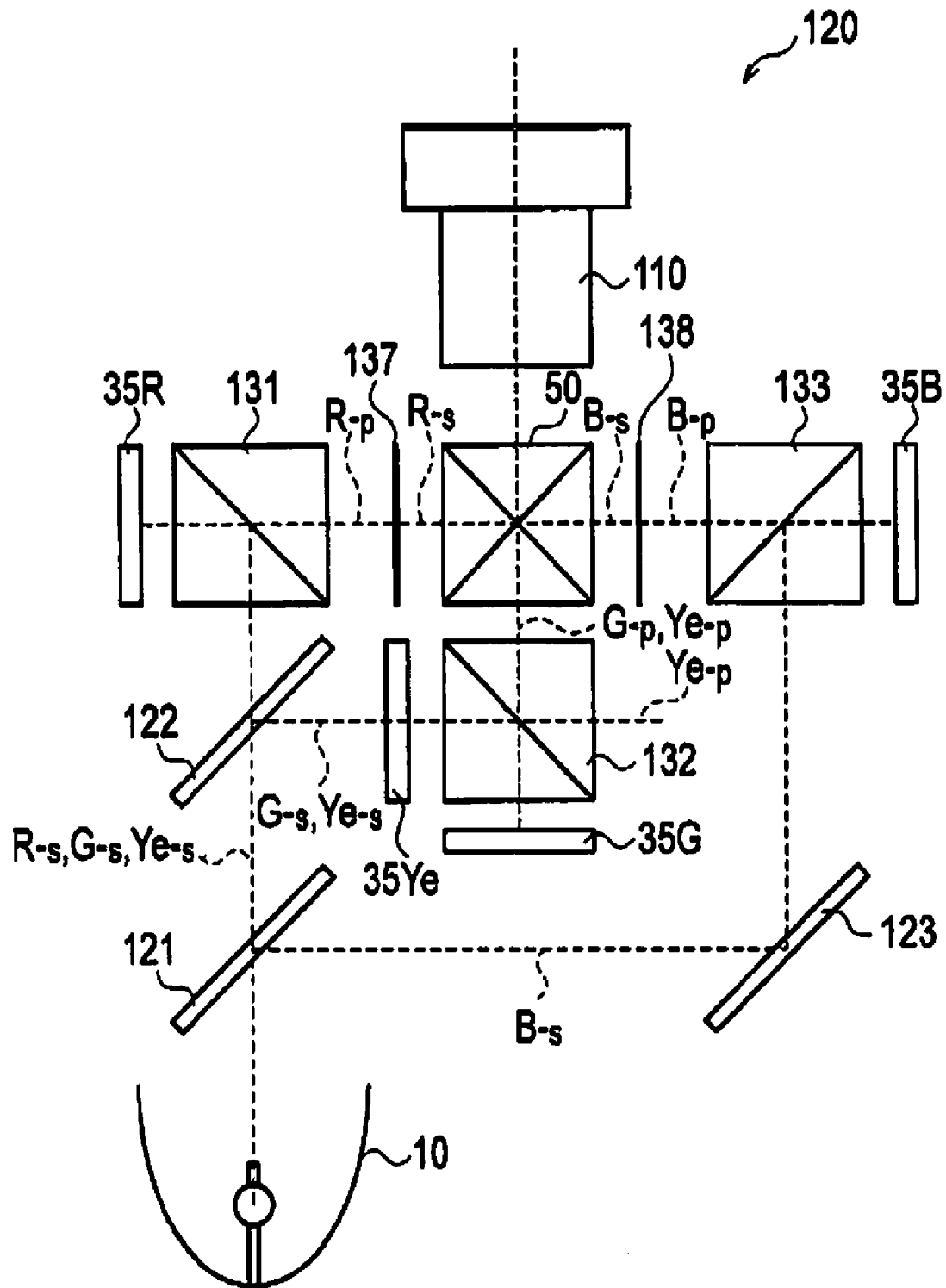
FIG. 8 is a view schematically showing a configuration of a lighting unit 120 according to a third embodiment.

A schematic configuration of a lighting unit according to the third embodiment will be given below by referring to the drawing. FIG. 8 is a view showing a schematic configuration of a lighting unit 120 according to the third embodiment. Note that in FIG. 8, similar reference numerals will be given to denote components similar to those of the first embodiment.

As shown in FIG. 8, the lighting unit 120 has a light source 10, a plurality of liquid crystal panels 35 (liquid crystal panels 35R, 35G, and 35B), a polarization adjustment element 35Ye, a plurality of mirror groups (mirrors 121 to 123), a plurality of PBS cubes (PBS cubes 131 to 133), a plurality of phase difference plates (phase difference plates 137 and 138), and a cross dichroic cube 50.

The liquid crystal panel 35R rotates the polarization direction (here, S polarization direction) of red component light which enters the liquid crystal panel 35R and reflects the red component light having P polarization direction. Similarly, the liquid crystal panel 35G rotates the polarization direction (here, S polarization direction) of green component light and yellow component which enter the liquid crystal panel 35G and reflects the green component light and the yellow component light which have P polarization direction. The liquid crystal panel 35B rotates the polarization direction (here, S polarization direction) of blue component light which enters the liquid crystal panel 36B and reflects the blue component light having P polarization direction.

The polarization adjustment element 35Ye modulates yellow component light by rotating the polarization direction of the yellow component light. In contrast, the polarization adjustment element 35Ye transmits green component light without rotating the polarization direction of green component light.

The mirror 121 is a dichroic mirror configured to transmit the red component light, the green component light, and the yellow component light, and reflect the blue component light. The mirror 122 is a dichroic mirror configured to transmit the red component light and reflect the green component light and the yellow component light. The mirror 123 is a reflector configured to reflect blue component light to lead it towards the liquid crystal panel 35B.

The PBS cube 131 has a PBS film configured to reflect S-polarized component light and transmit P-polarized component light. Specifically, the PBS cube 131 reflects the red component light ($R_{-s}$) having S polarization direction to lead it towards the liquid crystal panel 35R. The PBS cube 131 transmits the red component light ($R_{-p}$) having P polarization direction reflected by the liquid crystal panel 35R to lead it towards the cross dichroic cube 50.

The PBS cube 132 has a PBS film configured to reflect S-polarized component light and transmit P-polarized component light. Specifically, the PBS cube 132 reflects the green component light ($R_{-s}$) having S polarization direction to lead it towards the liquid crystal panel 35G. The PBS cube 132 transmits the green component light ($G_{-p}$) having P polarization direction reflected by the liquid crystal panel 35G to lead it towards the cross dichroic cube 50.

In addition, the PBS cube 132 reflects yellow component light ($Ye_{-s}$) having S polarization direction emitted from the polarization adjustment element 35Ye to lead it towards the liquid crystal panel 35G. In contrast, the PBS cube 132 transmits yellow component light ($Ye_{-p}$) having P polarization direction emitted from the polarization adjustment element 35Ye. The PBS cube 132 reflects yellow component light ($Ye_{-p}$) having P polarization direction reflected by the liquid crystal panel 35G to lead it towards the cross dichroic cube 50.

In this manner, noted that the yellow component light ($Ye_{-s}$) having S polarization direction emitted from the polarization adjustment element 35Ye enters the liquid crystal panel 35G together with the green component light ($G_{-s}$) having S polarization direction.

The PBS cube 133 has a PBS film configured to reflect S-polarized component light and transmit P-polarized component light. Specifically, the PBS cube 133 reflects blue component light ($B_{-s}$) having S polarization direction to lead it towards the liquid crystal panel 35B. The PBS cube 138 transmits blue component light ($B_{-p}$) having P polarization direction reflected by the liquid crystal panel 35B to lead it towards the cross dichroic cube 50.

The phase difference panel 137 rotates the polarization direction of red component light at 90°. Specifically, the phase difference plate 137 rotates the polarization direction of red component light having P polarization direction and leads the red component light having S polarization direction towards the cross dichroic cube 50.

The phase difference panel 138 rotates the polarization direction of blue component light at 90°. Specifically, the phase difference plate 138 rotates the polarization direction of blue component light having P polarization direction and leads the blue component light having S polarization direction towards the cross dichroic cube 50.

(Function and Effect)

The projection display device 100 according to the third embodiment can obtain effects similar to those of the above-mentioned first embodiment even if a reflection-type liquid crystal panel (LCOS) is used.

Note that even if three color lights are used, the PBS cubes 131 to 133 are required, and thus the distance between each liquid crystal panel 35 and the projection lens unit 110 (a back focus) is same as the case where three color lights are used.

Fourth Embodiment

A fourth embodiment of the present invention will be described below by referring to the drawings. In the following, the description will be mainly given to differences between the above-mentioned first embodiment and the fourth embodiment.

Specifically, in the above-mentioned first embodiment, a transmission-type crystal panel is used as a light valve, but in the fourth embodiment, a reflection-type liquid crystal panel (LOCS: Liquid Crystal On Silicon) is used as on light valve.

(Schematic Configuration of a Lighting Unit)

Figure 9:
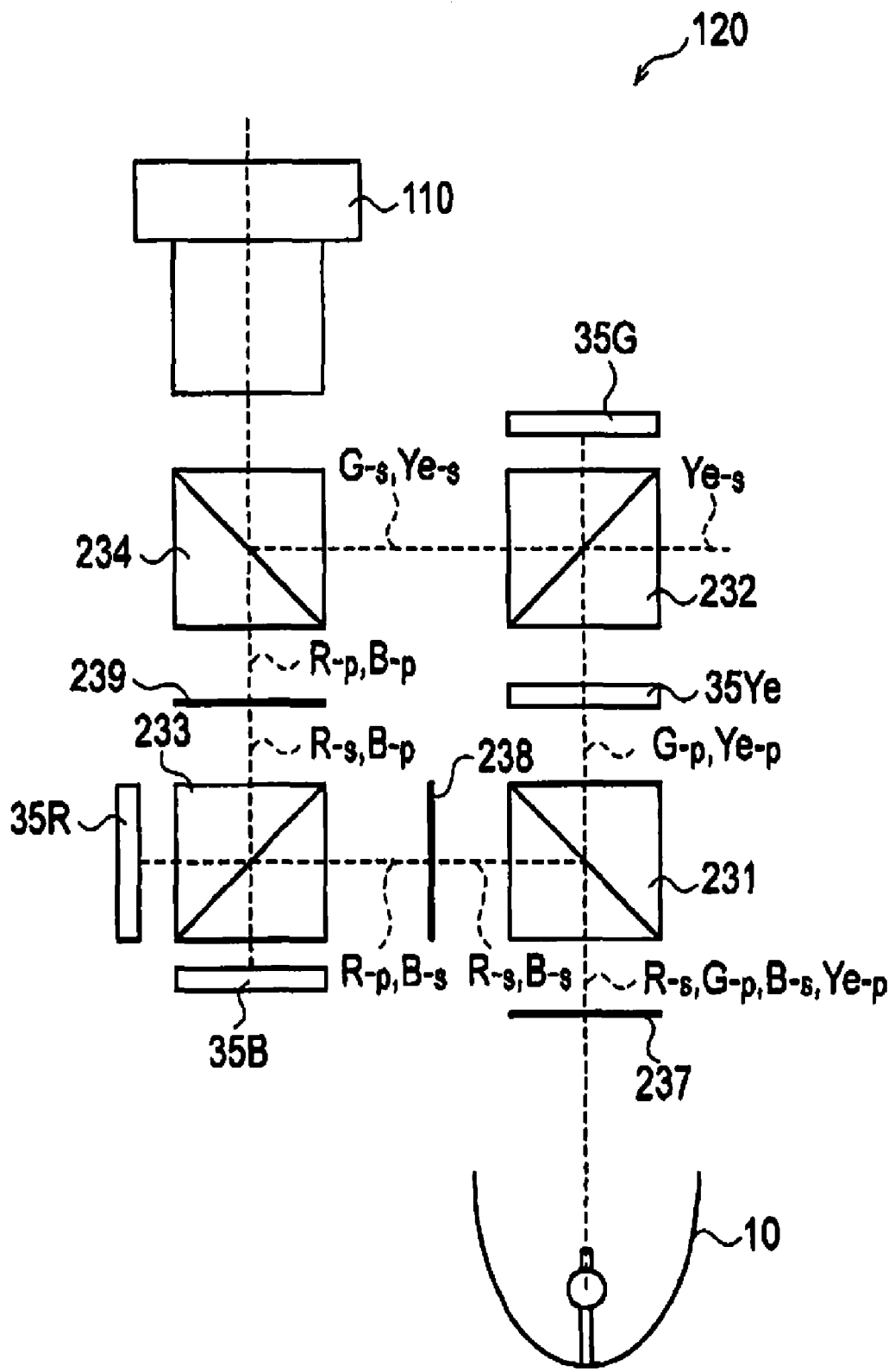
FIG. 9 is a view schematically showing a configuration of a lighting unit 120 according to a fourth embodiment.

A schematic configuration of a lighting unit according to the fourth embodiment will be described below by referring to the drawing. FIG. 9 is a view schematically showing a configuration of a lighting unit 120 according to the fourth embodiment. Note that in FIG. 9, similar reference numerals are given to denote components similar to those of the first embodiment.

In addition, note that similar to the first embodiment, in FIG. 9, a pair of fly-eye lenses configured to uniformize lights emitted from a light source 10, PBS (Polarized Beam Splitter) configured to cause polarization directions of lights emitted from the light source 10 to be one polarization direction (for example, P polarization direction), and the like are omitted.

As shown in FIG. 9, the lighting unit 120 has a light source 10, a plurality of liquid crystal panels 35 (liquid crystal panels 35R, 35G, and 35B), a polarization adjustment element 35Ye, a plurality of PBS cubes (PBS cubes 231 to 234), and a plurality of narrow band phase difference plates (narrow band phase difference plates 237 to 239).

The liquid crystal panel 35R rotates the polarization direction (here, P polarization) of red component light which enters the liquid crystal panel 35R and reflects the red component light having S polarization direction. Similarly, the liquid crystal panel 35G rotates the polarization direction (here, P polarization direction) of green component light and yellow component light which enter the liquid crystal panel 35G and reflects the green component light and the yellow component light which have S polarization direction. The liquid crystal panel 35B rotates the polarization direction (here, S polarization direction) of blue component light which enters the liquid crystal panel 35B and reflects the blue component light having P polarization direction.

The polarization adjustment element 35Ye modulates the yellow component light by adjusting the polarization of the yellow component light. In contrast, the polarization adjustment element 35Ye transmits the green component light without adjusting the polarization of the green component light.

Moreover, the arrangement of the polarization adjustment element 35Ye is not limited to the light emitting side of the PBS cube 231. The arrangement of the polarization adjustment element 35Ye may be the light emitting side of the PBS cube 232.

The PBS cube 231 has a PBS film configured to reflect S-polarized component light and transmit P-polarized component light. Specifically, the PBS cube 231 transmits the green component light ($G_{-p}$) and the yellow component light ($Ye_{-p}$), both having P polarization direction, to lead them towards the PBS cube 232. The PBS cube 231 reflects the red component light ($R_{-s}$) and the blue component light ($B_{-s}$), both having S polarization direction, to lead them towards the PBS cube 233.

The PBS cube 232 has a PBS film configured to reflect S-polarization component light and transmit P-polarization component light. Specifically, the PBS cube 232 transmits the green component light ($G_{-p}$) having P polarization direction to lead it towards the liquid crystal panel 36G. The PBS cube 232 reflects the green component light ($G_{-s}$) having S polarization direction reflected by the liquid crystal panel 35G to lead it towards the PBS cube 234.

In addition, the PBS cube 232 reflects yellow component light ($Ye_{-s}$) having S polarization direction emitted from the polarization adjustment element 35Ye. In contrast, the PBS cube 232 transmits the yellow component light ($Ye_{-p}$) having P polarization direction emitted from the polarization adjustment element 35Ye to lead it towards the liquid crystal panel 35G. The PBS cube 232 reflects the yellow component light ($Ye_{-s}$) having S polarization direction reflected by the liquid crystal panel 35G to lead it towards the PBS cube 234.

The PBS cube 233 has a PBS film configured to reflect S-polarized component light and transmit P-polarized component light. Specifically, the PBS cube 233 transmits the red component light ($R_{-p}$) having P polarization direction to lead it towards the liquid crystal panel 35R. The PBS cube 233 reflects the red component light ($R_{-s}$) having S polarization direction reflected by the liquid crystal panel 35R to lead it towards the PBS cube 234.

In addition, the PBS cube 233 reflects blue component light ($B_{-s}$) having S polarization direction to lead it towards the liquid crystal panel 35B. The PBS cube 233 transmits blue component light ($B_{-p}$) having P polarization direction reflected by the liquid crystal panel 35B to lead it towards the PBS cube 234.

The PBS cube 234 has a PBS film configured to reflect S-polarized component light and transmit P-polarized component light. Specifically, the PBS cube 234 transmits the red component light ($R_{-p}$) and the blue component light ($B_{-p}$), both having P polarization direction, to lead them towards the projection lens unit 110. The PBS cube 234 reflects the green component light ($G_{-s}$) and the yellow component light ($Ye_{-s}$), both having S polarization direction, to lead them towards the projection lens unit 110.

The narrow band phase difference plate 237 rotates only the polarization direction of specific color component light and does not rotate the polarization direction of another color component light. For example, when polarization directions of color component lights are caused to be P polarization direction, the narrow band phase difference plate 237 transmits the red component light and the blue component light by rotating the polarization direction of the red component light and the blue component light at 90° and transmits green component light and yellow component light without rotating the polarization direction of the green component light and the yellow component light. In contrast, when polarization directions of color component lights are caused to be S polarization direction, the narrow band phase difference plate 237 transmits the red component light and the blue component light without rotating them and transmits the green component light and the yellow component light by rotating the polarization direction of the green component light and the yellow component light at 90°.

The narrow band phase difference plate 238 rotates only the polarization direction of specific color component light and does not rotate the polarization direction of another color component light. Here, the narrow band phase difference plate 238 transmits the red component light by rotating the polarization direction of the red component light and transmits the blue component light without rotating the polarization direction of the blue component light.

The narrow band phase difference plate 239 rotates only the polarization direction of specific color component light and does not rotate the polarization direction of another color component light. Here, the narrow band phase difference plate 239 transmits the red component light by rotating the polarization direction of the red component light at 90° and transmits the blue component light without rotating the polarization direction of the blue component light.

Note that in the fourth embodiment, the PBS cubes 232 to 234 compose a color combiner configured to combine lights emitted from the liquid crystal panels 35R, 35G, and 35B.

Note that a polarizing plate, configured to transmit S-polarized component light and reflect P-polarized component light, may be arranged on the light emitting side of the PBS cube 232. A polarizing plate, configured to transmit P-polarized component light and reflect S-polarized component light, may be arranged on the light emitting side of the narrow band phase difference plate 239.

(Function and Effect)

The projection display device 100 according to the fourth embodiment can obtain effects similar to those of the first embodiment even if a reflection-type liquid crystal panel (LCOS) is used.

Note that even if three color lights are used, the PBS cubes 231 to 234 are needed, and thus the distance between each liquid crystal panel 35 and the projection lens unit 110 in the projection display device 100 according to the fourth embodiment is similar to that in the case where three color lights are used.

Fifth Embodiment

A fifth embodiment of the present invention will be described below by referring to the drawings. In the following, the description will be mainly given to differences between the above-mentioned first embodiment and the fifth embodiment.

Specifically, in the first embodiment, the polarization adjustment element 30Ye which switches the polarization direction of yellow component light is provided in a stage following the element (the mirror 22) which separates the green component light and the blue component light.

In contrast, in the fifth embodiment, a polarization adjustment element 30Ye which switches the polarization direction of yellow component light is provided in a stage preceding an element (a mirror 322) which separates the green component light and the red component light.

(Schematic Configuration of a Lighting Unit)

Figure 10:
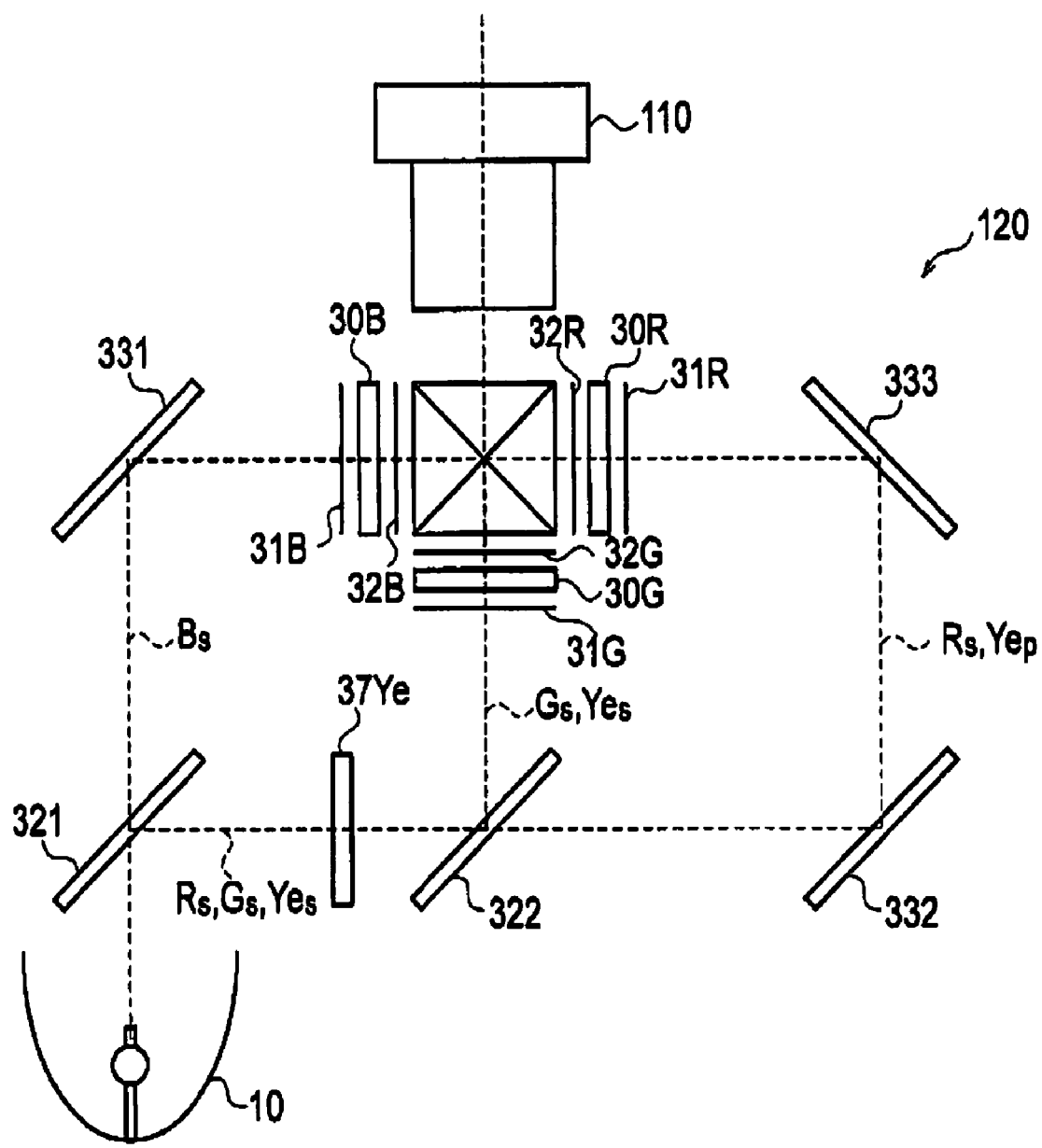
FIG. 10 is a view schematically showing a configuration of a lighting unit 120 according to a fifth embodiment.

A schematic configuration of a lighting unit according to the fifth embodiment will be described below by referring to the drawing. FIG. 10 is a view schematically showing a configuration of a lighting unit 120 according to the fifth embodiment. Note that in FIG. 10, similar reference numerals are given to denote components similar to those in FIG. 2.

In addition, note that similar to the first embodiment, in FIG. 10, a pair of fly-eye lenses configured to uniformize lights emitted from a light source 10, PBS (Polarized Beam Splitter) configured to cause polarization directions of lights emitted from the light source 10 to be one polarization direction (for example, P polarization direction), and the like are omitted.

In FIG. 10, the description will be given to a case where polarization directions of lights emitted from the light source 10 are caused to be S polarization before the lights emitted from the light source 10 are not separated into each color component light.

As shown in FIG. 10, the lighting unit 120 includes a light source 10, a plurality of liquid crystal panels 30 (liquid crystal panels 30R, 30G, and 30B), a polarization adjustment element 37Ye, a cross dichroic cube 50, and a plurality of mirror groups (mirrors 321 and 322, and mirrors 331 to 333).

Figure 11:
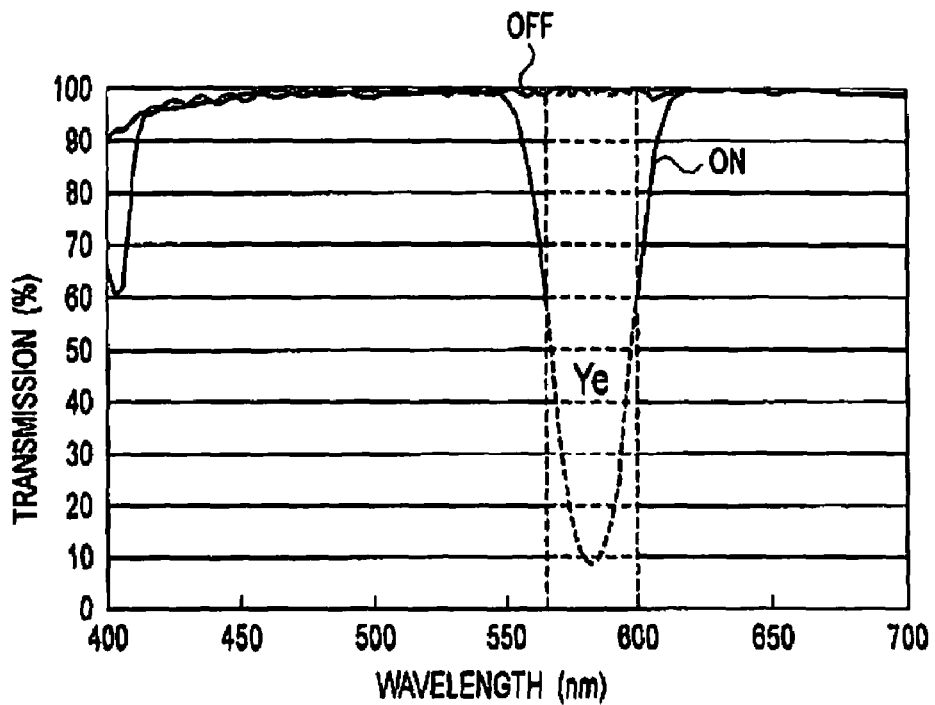
FIG. 11 is a graph showing a polarization adjustment element 37Ye according to the fifth embodiment.

The polarization adjustment element 37Ye is provided between the mirrors 321 and 322 on the optical path of combined lights reflected by the mirror 321. As shown in FIG. 11, the polarization adjustment element 37Ye is configured so that only the polarization direction of yellow component light of the combined light reflected by the mirror 321 can be switched. In FIG. 11, the longitudinal axis shows a percentage (a transmission) of transmitting the polarization direction of the combined light without rotating the polarization direction of the combined light, and the lateral axis is a wavelength of the combined light.

As shown in FIG. 11, in a state where a voltage is not applied to the polarization adjustment element 37Ye, the polarization adjustment element 37Ye transmits the combined light without rotating the polarization direction of the combined light. That is, the polarization adjustment element 37Ye transmits the combined light including the red component light, the green component light and the yellow component light with S polarization.

In contrast, in a case where a voltage is applied to the polarization adjustment element 37Ye, the polarization adjustment element 37Ye transmits the combined light by rotating only the polarization direction of yellow component light. That is, the polarization adjustment element 37Ye transmits the red component light and the green component light with S polarization and transmits yellow component light with P polarization.

The mirror 321 is a dichroic mirror configured to reflect the combined light including the red component light, the green component light, and the yellow component light, and transmit the blue component light. The mirror 322 is a dichroic mirror configured to reflect the green component light and transmit the red component light.

Figure 12:
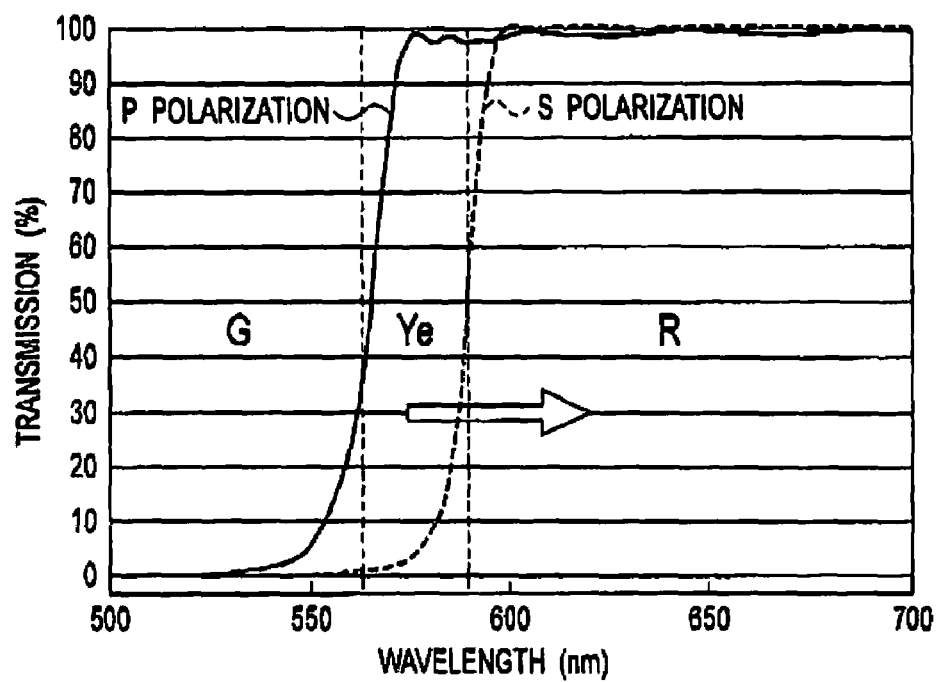
FIG. 12 is a graph showing a cutoff wavelength of a mirror 322 according to the fifth embodiment.

Here, as shown in FIG. 12, a cutoff wavelength of the mirror 322 is provided between the wavelength band of green component light and the wavelength band of red component light. In addition, a cutoff wavelength of the mirror 322 varies depending on the polarization direction of light which enters the mirror 322.

Specifically, if the polarization direction of light which enters the mirror 322 is P polarization, the cutoff wavelength of the mirror 322 is a wavelength in a vicinity of the boundary between the wavelength band of green component light and the wavelength band of yellow component light. In contrast, if the polarization direction of light which enters the mirror 322 is S polarization, the cutoff wavelength of the mirror 322 is a wavelength in a vicinity of the boundary between the wavelength band of yellow component light and the wavelength band of red component light.

If the yellow component light having S polarization enters the mirror 322 in a state where the polarization adjustment element 37Ye does not rotate the polarization direction of the yellow component light, the yellow component light is led towards the liquid crystal panel 30G by being reflected by the mirror 322.

In contrast, if the yellow component light having S polarization enters the mirror 322 in a state where the polarization adjustment element 37Ye rotates the polarization direction of the yellow component light, the yellow component light transmits the mirror 322 to be led towards the liquid crystal panel 30R.

Here, the polarization direction of yellow component light to be led towards the liquid crystal panel 30R (P polarization) differs from the polarization direction of red component light to be led towards the liquid crystal panel 30R. Accordingly, the yellow component light having P polarization to be led towards the liquid crystal panel 30R is shielded by a polarizing plate 31R provided on the light-incident-side of the liquid crystal panel 31R.

In this manner, even when the arrangement of the polarization adjustment element 37Ye is changed, it is possible to easily switch ON/OFF of the yellow component light.

The mirror 331 reflects blue component light which transmits the mirror 321 to lead it towards the liquid crystal panel 30B. The mirrors 332 and 333 reflect light which transmit the mirror 322 (mainly red component light) to lead it towards the liquid crystal panel 30R.

Sixth Embodiment

A sixth embodiment of the present invention will be described below by referring to the drawings. In the sixth embodiment, the configuration of the above-mentioned liquid crystal panel 30 will be described in detail.

(Configuration of a Light Valve)

Figure 13:
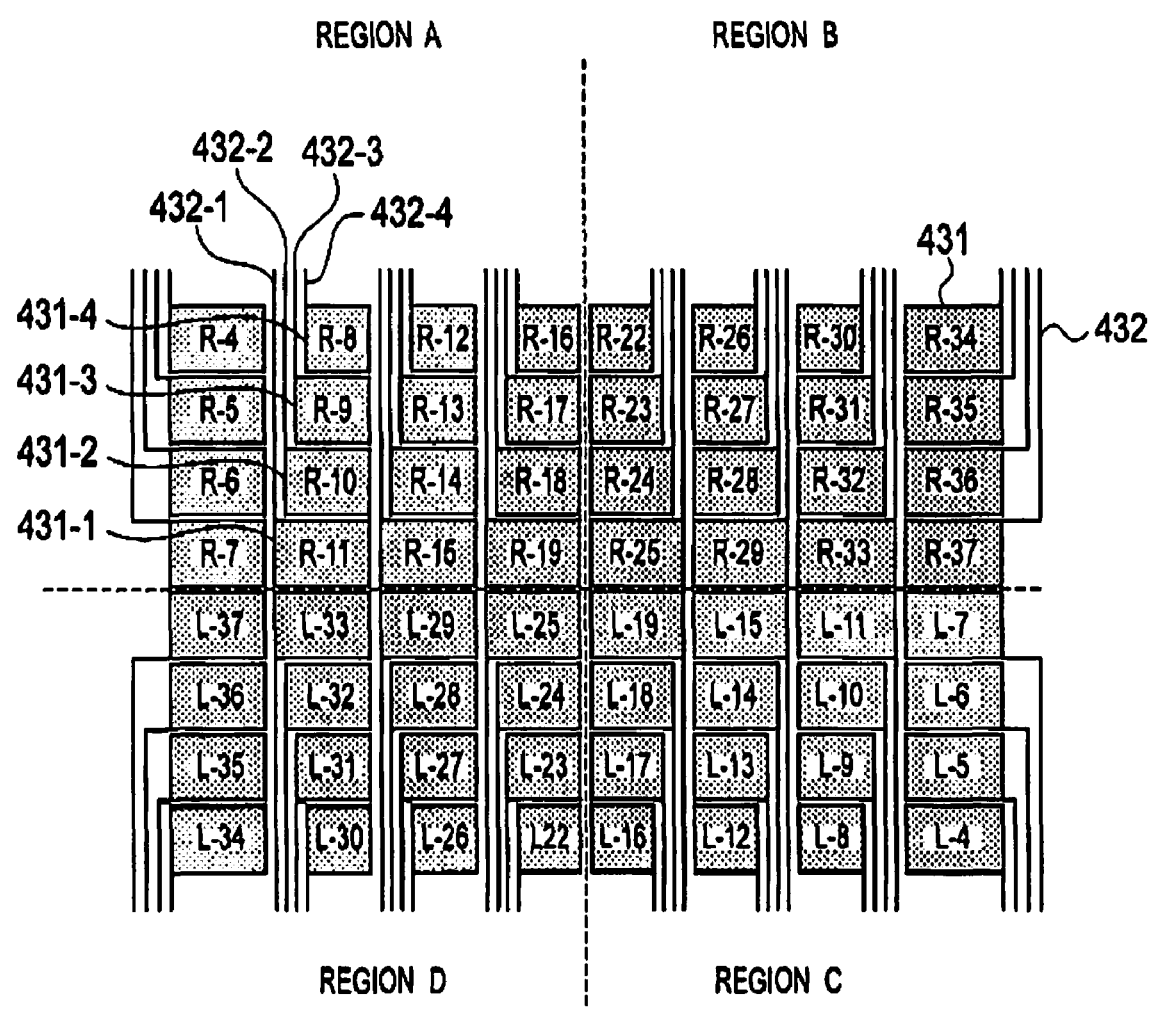
FIG. 13 is a view showing a configuration of a liquid crystal panel 30 according to a sixth embodiment.

A configuration of a light valve according to a sixth embodiment will be described below by referring to the drawings. FIG. 13 is a view showing a configuration of a liquid crystal panel 30 (particularly, a polarization adjustment element 30Ye or the like). Note that FIG. 18 is a view of the liquid crystal panel 30 which is seen from the light incident surface (or the light-emitting surface) side of the liquid crystal panel 30.

As shown in FIG. 13, the liquid crystal panel 30 has a plurality of segments 431 and a plurality of transparent electrodes 432.

The segments 431 are arranged in a matrix and can be considered as four regions (regions A to D).

In the regions (regions A and B) formed on the upper half of the liquid crystal panel 30, the higher the position of the segment 431 is, the smaller the area of the segment 431 becomes. On the other hand, in the regions (regions C and D) formed on the lower half of the liquid crystal panel 30, the lower the position of the segment 431 is, the smaller the area of the segment 431 becomes.

Meanwhile, in the regions (regions A and D) formed on the left half of the liquid crystal panel 30, the transparent electrode 432 is provided on the left side of each segment 431. In the regions (regions B and C) formed on the right half of the liquid crystal panel 30, the transparent electrode 432 is provided on the right side of each segment 431.

Herein, the configuration of each segment 431 will be more specifically explained taking segments 431-1 to 431-4 as examples.

The area of the segment 431-2 provided above the segment 431-1 is smaller than that of the segment 431-1 by the width of the transparent electrode 432-1 connected to the segment 431-1.

The area of the segment 431-3 provided above the segment 431-2 is smaller than that of the segment 431-2 by the width of the transparent electrode 432-2 connected to the segment 431-2. In other words, the area of the segment 431-3 is smaller than that of the segment 431-1 by the widths of the transparent electrodes 432-1 and 432-2.

The area of the segment 431-4 provided above the segment 431-3 is smaller than that of the segment 431-3 by the width of the transparent electrode 432-3 connected to the segment 431-3. In other words, the area of the segment 431-4 is smaller than that of the segment 431-1 by the widths of the transparent electrodes 432-1 to 432-3.

Each of the transparent electrodes 432 is formed of a transparent material and is connected to each segment 431. Moreover, the transparent electrodes 432 are provided in the space generated by the reduction in areas of the segments 431.

In the regions (regions A and B) formed on the upper half of the liquid crystal panel 30, the transparent electrodes 432 are connected to an FPC: Flexible Printed Circuit, (not shown) formed on the upper side of the liquid crystal panel 30. In the regions C and D) formed on the lower half of the liquid crystal panel 30, the transparent electrodes 432 are connected to an FPC (not shown) formed on the lower side of the liquid crystal panel 30.

Incidentally, although the sixth embodiment has shown the case in which FPCs are provided on the upper and lower portions of the liquid crystal panel 30, the present invention is not limited to this. More specifically, FPCs may be provided at the right and left sides of the liquid crystal panel 30. In this case, the configuration shown in FIG. 13 may be, of course, rotated by 90 degrees.

(Function and Effect)

According to the liquid crystal panel 30 of the sixth embodiment, in the case where it is unfavorable to route the transparent electrodes 432 in the thickness direction of the liquid crystal panel 30, that is, in the case where it is favorable to route the transparent electrodes 432 in the light incident surface (light emitting surface), it is possible to efficiently reduce the space in which the transparent electrodes 432 are provided. In other words, the proportion of each segment 431 provided in the liquid crystal panel 30 is increased, thereby making it possible to obtain a sufficient modulation effect caused by each segment 431.

By using the transparent electrode 432 as the electrode connected to each segment 431, a decrease in utilization efficiency of light attributable to electrodes can be prevented.

By providing FPCs on the upper and lower portions of the liquid crystal panel 30, the length of each transparent electrode 432 is shortened. Thus, electric resistance in the transparent electrodes 432 can be reduced, and the width of each transparent electrode 432 can be made narrower.

[Utilization of Yellow Component Light]

Figure 14:
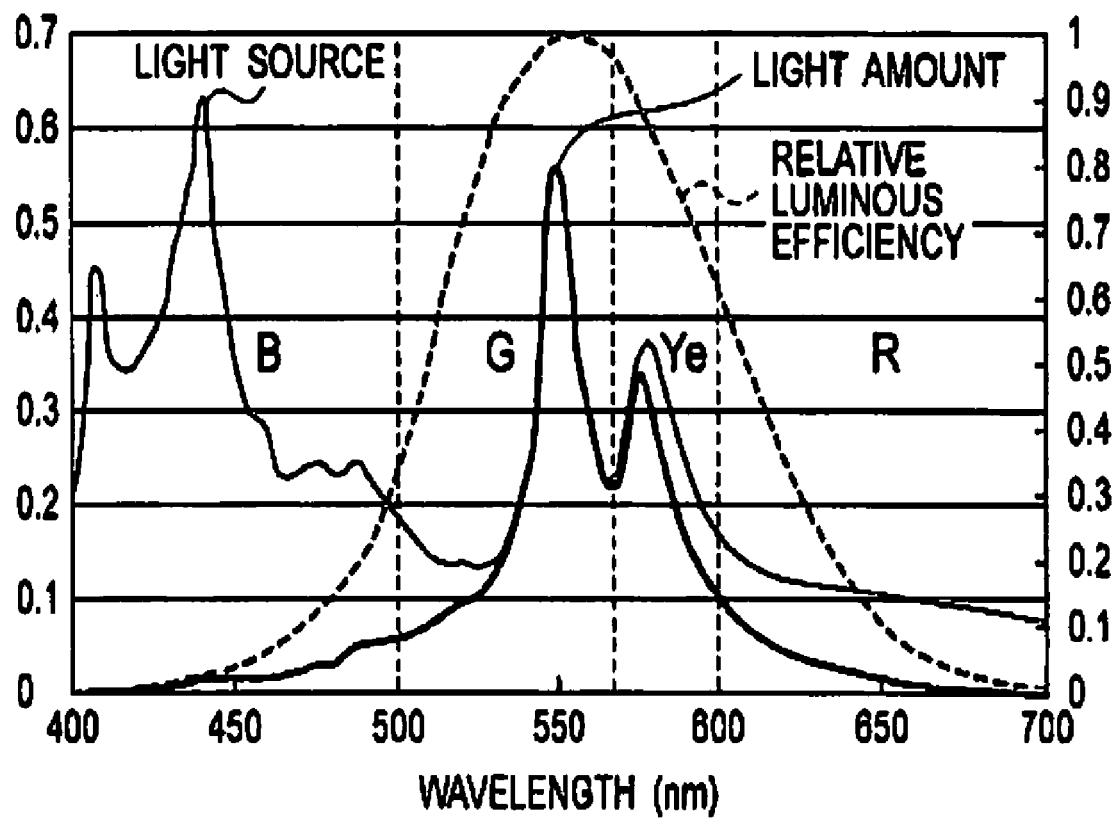
FIG. 14 is a graph showing light emitted from a light source 10 (a UHP lamp).

The following will explain the utilization of yellow component light with reference to the drawing. FIG. 14 is a view for explaining light emitted by the aforementioned light source 10 (UHP lamp). Here, the amount of light is derived from a product of energy of light emitted from the light source 10, and relative luminous efficiency.

As shown in FIG. 14, there is a tendency that the relative luminous efficiency reaches a peak at a wavelength range corresponding to green component light and decreases at a short wavelength side (blue component light) and at a long wavelength side (red component light). Accordingly, even if the energy of light emitted from the light source 10 such as a UHP lamp reaches a peak at around 440 nm (blue component light), around 550 nm (green component light) and around 580 nm (yellow component light) in this order, the amount of light emitted from the light source 10 reaches a maximum at the wavelength range corresponding to green component light. In addition, the amount of light emitted from the light source 10 reaches the second highest value at a wavelength range corresponding to yellow component light, next to the wavelength range corresponding to green component light.

Thus, in view of the energy of light emitted from the light source 10 and relative luminous efficiency, it can be seen that yellow component light largely contributes to a light amount of an image.

Accordingly, projection display apparatuses have been proposed that are configured to utilize yellow component light that was not conventionally utilized. For example, proposed are a projection display apparatus which does not have color filters that shield yellow component light for example, Japanese Patent Publication No. 2000-137289) and a four-plate projection display apparatus (for example, Japanese Patent Publication No. 2002-237247).

In the aforementioned embodiments, using yellow component light leads to improvement in luminance and employing liquid crystal panel 30Ye (or liquid crystal panel 31Ye) suppresses a reduction in color reproduction capability. Moreover, since another liquid crystal panel 30 is irradiated with yellow component light which is emitted from the liquid crystal panel 30Ye (or liquid crystal panel 31Ye), the back focus of the projection lens unit 110 does not become long as compared with the conventional case.

Other Embodiments

The present invention has been described by the above-mentioned embodiments, but the description and drawings which constitute a part of this disclosure should not be understood as to limit the scope of the present invention. For those who are skilled in the art, various alternative embodiments, examples, and operating techniques will be apparent from this disclosure.

For example, in the above-mentioned embodiments, superimposed component light to be superimposed on the yellow component light is green component light, but it is not limited to this. The superimposed component light to be superimposed on the yellow component light may be red component light. In this case, the red component light enters the polarization adjustment element 30Ye together with yellow component light. However, note that since yellow is a complementary color of blue, and thus it is not preferable that the superimposed component light to be superimposed on yellow component light be blue component light.

In the above-mentioned embodiments, the fourth color component light is the yellow component light, but it is not limited to this. The fourth color component light may be cyan component light or magenta component light. Specifically, it is preferable that superimposed component light to be superimposed on cyan component light be green component light or blue component light, and it is also preferable that superimposed component light to be superimposed on magenta component light be the red component light or the blue component light.

In the above-mentioned embodiments, the fourth color component light is single-color component light, but it is not limited to this. The fourth color component light may be multi-color component light.

In the above-mentioned embodiments, it is premised on that the polarization adjustment element is the polarization adjustment element 30Ye with no resolution, but it is not limited to this. Specifically, the polarization adjustment element may be a liquid crystal panel for the fourth color with a resolution. In this case, it is preferable that the resolution of the liquid crystal panel for the fourth color be smaller than those of the liquid crystal panels 30R, 30G, and 30B in order to prevent the deterioration of transmission caused by electrodes or the like. However, note that the resolution of the liquid crystal panel for the fourth color may be equal to those of the liquid crystal panels 30R, 30G, and 30B.

What is claimed is:

1. An illumination apparatus comprising:
   a red light valve configured to modulate red component light according to a red input signal;
   a green light valve configured to modulate green component light according to a green input signal;
   a blue light valve configured to modulate blue component light according to a blue input signal;
   a polarization adjustment element configured to adjust polarization of fourth color component light; and
   a color combiner configured to combine light emitted from the red light valve, the green light valve and the blue light valve, wherein,
   a superimposed component light which is any one of the red component light, the green component light and the blue component light enters the polarization adjustment element together with the fourth color component light, and
   the polarization adjustment element transmits the superimposed component light without adjusting the polarization, and transmits the fourth color component light with adjusting the polarization, and
   the superimposed component light and the fourth color component light emitted from the polarization adjustment element enter a specific light valve corresponding to the superimposed component light, among the red light valve, the green light valve and the blue light valve.

2. The illumination apparatus according to claim 1, wherein
   the polarization adjustment element is an element configured to selectively switch whether the polarization direction of the fourth color component light is not rotated or the polarization direction of the fourth color component light is rotated at 90°.

3. The illumination apparatus according to claim 1, wherein
   a resolution of the polarization adjustment element is lower than resolutions of the red light valve, the green light valve and the blue light valve.

4. The illumination apparatus according to claim 1, further comprising a modulation amount controller configured to control a modulation amount for adjusting the polarization of the fourth component light by the polarization adjustment element, on the basis of the red input signal, green input signal and blue input signal.

5. The illumination apparatus according to claim 1, wherein
   the specific light valve has a light-incident-side polarizing plate provided on a light-incident-side and a light-emitting-side polarizing plate provided on a light-emitting side,
   the light-incident-side polarizing plate shields the fourth color component light when the fourth color component light is not to be emitted to the color combiner, and
   the light-emitting-side polarizing plate shields the superimposed component light when the superimposed component light is not to be emitted to the color combiner.

6. A projection display device comprising:
   a light source configured to emit red component light, green component light, blue component light and fourth color component light;
   a red light valve configured to modulate the red component light according to a red input signal;
   a green light valve configured to modulate the green component light according to a green input signal;
   a blue light valve configured to modulate the blue component light according to a blue input signal;
   a polarization adjustment element configured to adjust polarization of fourth color component light;
   a color combiner configured to combine light emitted from the red light valve, the green light valve and the blue light valve; and
   a projection mean configured to project a light combined by the color combiner, wherein,
   a superimposed component light which is any one of the red component light, the green component light and the blue component light enters the polarization adjustment element together with the fourth color component light,
   the polarization adjustment element transmits the superimposed component light without adjusting the polarization, and transmits the fourth color component light with adjusting the polarization, and
   the superimposed component light and the fourth color component light which are emitted from the polarization adjustment element, enter a light valve corresponding to the superimposed component light, among the red light valve, the green light valve and the blue optical component.

* * * * *